United States Patent
Ferro dos Santos (10) Patent No.: US 10,643,289 B2
(45) Date of Patent: May 5, 2020

(54) CATTLE RAISING MANAGEMENT SYSTEM AND PROCESS

(71) Applicant: Robert Bosch Limitada, Campinas-SP (BR)

(72) Inventor: Gustavo Henrique Ferro dos Santos, Paulina (BR)

(73) Assignee: Robert Bosch Limitada, Campinas-SP (BR)

( * ) Notice: Subject to any disclaimer, the term of this patent is extended or adjusted under 35 U.S.C. 154(b) by 0 days.

(21) Appl. No.: 16/064,966

(22) PCT Filed: Nov. 25, 2016

(86) PCT No.: PCT/BR2016/050305
§ 371 (c)(1),
(2) Date: Jun. 21, 2018

(87) PCT Pub. No.: WO2017/106947
PCT Pub. Date: Jun. 29, 2017

(65) Prior Publication Data
US 2018/0374165 A1    Dec. 27, 2018

(30) Foreign Application Priority Data
Dec. 22, 2015  (BR) .................. BR1020150323190

(51) Int. Cl.
*G06Q 50/02* (2012.01)
*G06Q 10/00* (2012.01)
(Continued)

(52) U.S. Cl.
CPC ............ *G06Q 50/02* (2013.01); *A01K 11/006* (2013.01); *G06Q 10/00* (2013.01); *G06Q 10/06* (2013.01); *G06K 17/0022* (2013.01)

(58) Field of Classification Search
CPC ........ G06Q 10/00; G06Q 10/06; G06Q 50/02; H04W 84/18
(Continued)

(56) References Cited

U.S. PATENT DOCUMENTS 6,342,839 B1 * 1/2002 Curkendall .......... A01K 11/007
340/573.3
6,664,897 B2 * 12/2003 Pape .................... A01K 29/005
119/51.02
(Continued)

FOREIGN PATENT DOCUMENTS

AU    2007231879 A1    5/2008
KR    20100084392 A    7/2010

OTHER PUBLICATIONS

KR20100084392A_MT; Korea translation of the document 2010-0084392 by EZRF Co. Ltd; 14 pages; (Jul. 26, 2010). (Year: 2010).*
(Continued)

*Primary Examiner* — Nam V Nguyen
(74) *Attorney, Agent, or Firm* — Michael Best & Friedrich LLP (57) ABSTRACT

A cattle raising management system includes at least one terrain package (1) which includes a terrain intercommunication box (8), at least one propagation package (2) which includes a repeater intercommunication box (9) and at least one farm package (3) which includes a farm intercommunication box (10). The terrain intercommunication box (8), the repeater intercommunication box (9), and the farm intercommunication box (10) form a network where each of said boxes can be connected via radio waves to any of the other boxes.

17 Claims, 5 Drawing Sheets

(51) Int. Cl.
*A01K 11/00* (2006.01)
*G06Q 10/06* (2012.01)
*G06K 17/00* (2006.01)

(58) Field of Classification Search
USPC .................... 340/12.51, 10.1–10.5; 600/301
See application file for complete search history.

(56) References Cited

U.S. PATENT DOCUMENTS

| | | | | |
|---|---|---|---|---|
| 7,689,434 | B2* | 3/2010 | Cureton | A01K 5/02 |
| | | | | 705/1.1 |
| 7,843,350 | B2* | 11/2010 | Geissler | A01K 11/006 |
| | | | | 340/573.2 |
| 9,226,481 | B1* | 1/2016 | Paripati | G06T 7/0004 |
| 9,370,170 | B2* | 6/2016 | Downing | A01K 29/005 |
| 9,504,387 | B2* | 11/2016 | Alonsoperez Lanza | ................. |
| | | | | A61B 5/1112 |
| 9,538,729 | B2* | 1/2017 | Yarden | A01K 29/005 |
| 10,045,511 | B1* | 8/2018 | Yarden | A01K 11/004 |
| 2002/0010390 | A1* | 1/2002 | Guice | A01K 11/008 |
| | | | | 600/300 |
| 2003/0137431 | A1* | 7/2003 | Hogan | A61D 17/002 |
| | | | | 340/870.11 |
| 2004/0074448 | A1* | 4/2004 | Bunt | A01K 11/006 |
| | | | | 119/421 |
| 2006/0145815 | A1* | 7/2006 | Lanzieri | G06K 7/0008 |
| | | | | 340/10.2 |
| 2007/0008150 | A1* | 1/2007 | Hassell | A01K 11/006 |
| | | | | 340/573.1 |
| 2008/0147458 | A1* | 6/2008 | Yamazaki | A01K 11/008 |
| | | | | 705/7.11 |
| 2010/0030036 | A1* | 2/2010 | Mottram | A01K 11/00 |
| | | | | 600/301 |
| 2010/0261981 | A1* | 10/2010 | Griffioen | A61B 5/02055 |
| | | | | 600/301 |
| 2013/0285815 | A1* | 10/2013 | Jones, II | A01K 11/008 |
| | | | | 340/573.3 |
| 2016/0120144 | A1* | 5/2016 | Kim | A01K 1/0047 |
| | | | | 119/437 |
| 2017/0156288 | A1* | 6/2017 | Singh | A01K 11/002 |
| 2018/0295809 | A1* | 10/2018 | Yajima | H04B 17/318 |

OTHER PUBLICATIONS

International Search Report and Written Opinion of PCT/BR2016/050305, dated Mar. 3, 2017 (11 pages).

Pavan Sikka et al: "Wireless adhoc sensor and actuator networks on the farm", Information Processing in Sensor Networks, 2006. IPSN 2006. The Fifth International Conference on Nashville, TN, USA Apr. 19-21, 2006, Piscataway, NJ, USA.IEEE, 2 Penn Plaza, Suite 701 New York NY 10121-0701 USA, Apr. 19, 2006 (Apr. 19, 2006), pp. 492-499, XP058291195, DOI: 10.1145/1127777.1127852 ISBN: 978-1-59593-334-8 p. 492, left-hand column, line 1—p. 492, left-hand column, line 22 p. 493, right-hand column, line 55—p. 498, left hand column, line 16; Figures 1-14.

Kae Hsiang Kwong et al: "Practical considerations for wireless sensor networks in cattle monitoring applications", Computers and Electronics in Agriculture, Elsevier, Amsterdam, NL, vol. 81, Oct. 22, 2011 (Oct. 22, 2011), pp. 33-44, XP028442014, ISSN: 0168-1699, DOI: 10.1016/J.COMPAG.2011.10.013 [retrieved on Oct. 31, 2011] p. 39, right-hand column, line 19—p. 43, right-hand column, line 41; figures 8-16.

\* cited by examiner

CATTLE RAISING MANAGEMENT SYSTEM AND PROCESS

BACKGROUND OF THE INVENTION

The present invention relates to techniques for improving cattle raising management in technical fields such as cattle farming.

As the cattle is being raised, it has to be fed and monitored for weight gain, health conditions and behavior. Large herds raised on large-sized farms require advanced cattle raising management systems.

BRPI0903245-2 discloses a system for identifying and tracking animals, aiming at identifying, tracking, monitoring and controlling animals, and a farming production process based on weighing an animal, identifying the place where measurement was taken, identifying the animal through RFID ("radio frequency identification"), barcode etc.

BRPI0505959-3 discloses a bird weighing system consisting of weighing platforms placed inside sheds, and communication modules, which collect the data from the scales and transmit them to computers. The data stored in each computer are transmitted to a monitoring center by a data collector in serial communication, or a telecommunication system for transmitting data.

SUMMARY OF THE INVENTION

The purpose of the present invention is to improve the known processes and devices.

Thus, the invention is related to a cattle raising management system which includes:
- at least one terrain package which includes a device for interaction with the cattle and a terrain intercommunication box connected to the device for interaction with the cattle;
- at least one propagation package which includes a repeater intercommunication box;
- at least one farm package which includes a farm intercommunication box and a computer connected to the farm intercommunication box;
- said terrain intercommunication box, the repeater intercommunication box and the farm intercommunication box forming a network where each of said boxes can be connected via radio waves to any of the other boxes.

Said network formed by the terrain intercommunication box, the repeater intercommunication box and the farm intercommunication box can be a mesh network that may work according to the IEEE 802.11s standard or IEEE 802.15.4 standard.

Another object of the invention is a cattle raising management process utilizing a system as defined above and that consists of the following steps:
- storing from time to time in the terrain package at least one feature of at least one animal;
- transmitting said at least one feature to the farm package.

The invention allows for the implementation of a solution for managing cattle compatible with any terrain, even a harsh one (vegetation, topographical relief, presence of rivers or lakes etc.) and a large one, and that is totally flexible, i.e., that can be easily rearranged to change physical settings or increase/decrease the amount of packages.

Even if the different packages forming the system have different functions, each of them is capable of communicating to any other package. The subdivision of the system into packages like those allows for a more efficient, safer and more consistent data transmission. For example, a package can be relocated in a terrain and, without further configuration the system keeps working from the moment the relocated package is within the reach of the radio wave from any other package, even of a different function.

The system organizes redundancy in transmission and data storage which renders the system as a whole resilient to failure of any package and that allows for advanced data processing and subsequent provision of advanced indicators.

Since each package can communicate with any other package, the group of packages forms a self-configurable network intended for the traffic of data of all of the packages, irrespective of their function. It means that each package can take part in the data traffic of another package that does not exert the same function.

The terrain intercommunication box, repeater intercommunication box and farm intercommunication box have similar structures and can be produced in series with reduced cost.

Preferred features that can complement the system or process according to the invention are indicated below. The system or process may include one of these features or a group of these features combined.

The system also includes cloud-based networking connected to the computer.

The system further includes at least one mobility package that includes a mobile device connected to the computer or to the cloud-based networking.

The device for interaction with the cattle of the terrain package includes a radio frequency identifier and the system also includes a radio frequency tag for each animal.

The device for interaction with the cattle of the terrain package includes a weighing platform.

The device for interaction with the cattle of the terrain package includes a diffuser for application of paint or medicine.

The terrain package includes a mounting pole and/or a solar panel.

The propagation package includes a mounting pole and/or a solar panel.

The terrain interconnection box, the repeater interconnection box and the farm interconnection box include a processing unit and a wireless network unit.

The terrain interconnection box and the farm interconnection box include an interface unit.

The transmission of said at least one feature to the farm package is performed via the propagation package.

The transmission of said at least one feature to the farm package is performed via any one of the packages.

BRIEF DESCRIPTION OF THE DRAWINGS

The invention is detailed below by the description of a preferred embodiment, exemplified by the figures, wherein.

DETAILED DESCRIPTION

Figure 1:
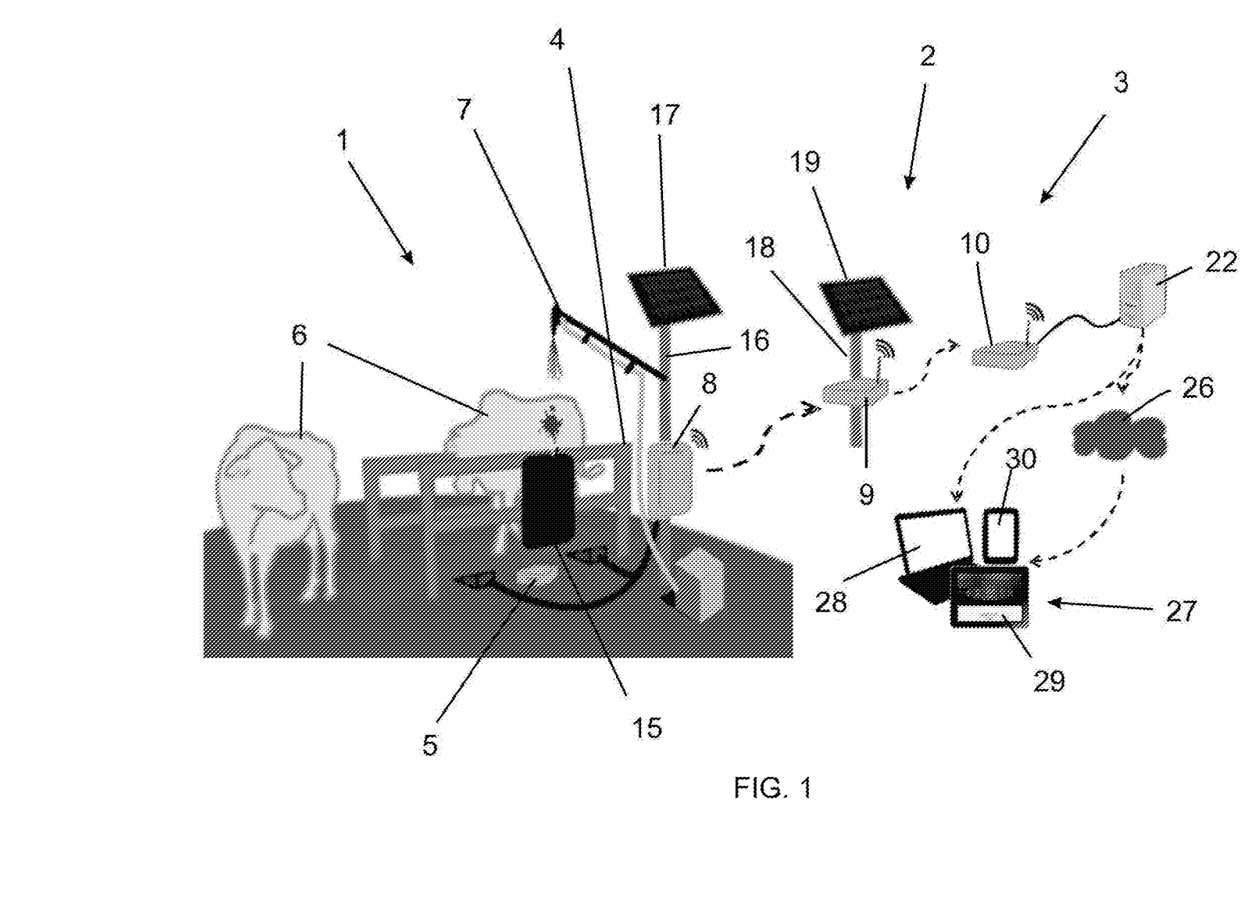
FIG. 1 is a simplified scheme displaying the different elements that form the system according to the invention.

FIG. 1 represents the basic elements forming a system according to the invention.

The cattle raising management system is intended for use on a cattle-farming farm and to manage cattle on two levels:
  on the terrain level: by collecting data on animals, such as weight, size, behavior, etc. and by taking measures in favor of the animals, like marking, administration of medicaments, etc.;
  on the decision-making level: by providing the farmer with the data collected in an appropriate fashion to monitor the herd and aid decision-making, such as cattle relocation, slaughter, etc.

FIG. 1 represents a minimal cattle management system which includes: a terrain package 1 intended for data collection and action on animals; a propagation package 2 intended for data transmission; and a farm package 3 intended for data exploitation. Each of said packages 1, 2, 3 includes a data intercommunication box 8, 9, 10 intended to form a mesh network for data traffic in the system as explained below.

The terrain package 1 includes a device 4 for interaction with the cattle which, in the present example, is a cattle treatment station that includes a scale, or weighing platform 5 for measuring the weight of the animal 6, a diffuser 7 for application of medicine or marking ink on the animal 6, and an identifier 15 to identify the animal 6 through radio frequency. The identifier 15 is a usual RFID-type (Radio Frequency IDentification) equipment which detects the presence of an animal 6 and that identifies said animal by a unique RFID tag attached to it.

The device 4 for interaction with the cattle may consist of any cattle treatment station besides the examples herein provided. The weighing platform 5, cited as an example, is well-known in the farming field since weight is crucial to controlling an animal's health and diet, which also enables one to evaluate the efficacy of changes in the diet, animal supplementation, application of medicaments etc. Weighing can be carried out with load cells or an optical system, for example. Managing weight with the system is advantageous both to the farm which employs it and the farming industry as a whole (including the pharmaceutical companies, consulting firms etc.).

Alternatively, the device 4 for interaction with the cattle may be only a weighing platform 5, only a diffuser 7, only a radio frequency identifier 15, placed, e.g., by the waterer, or any other kind of device for interaction with the cattle.

The terrain package 1 includes a terrain intercommunication box 8 connected to the device 4 for interaction with the cattle.

Figures 2, 3, 4:
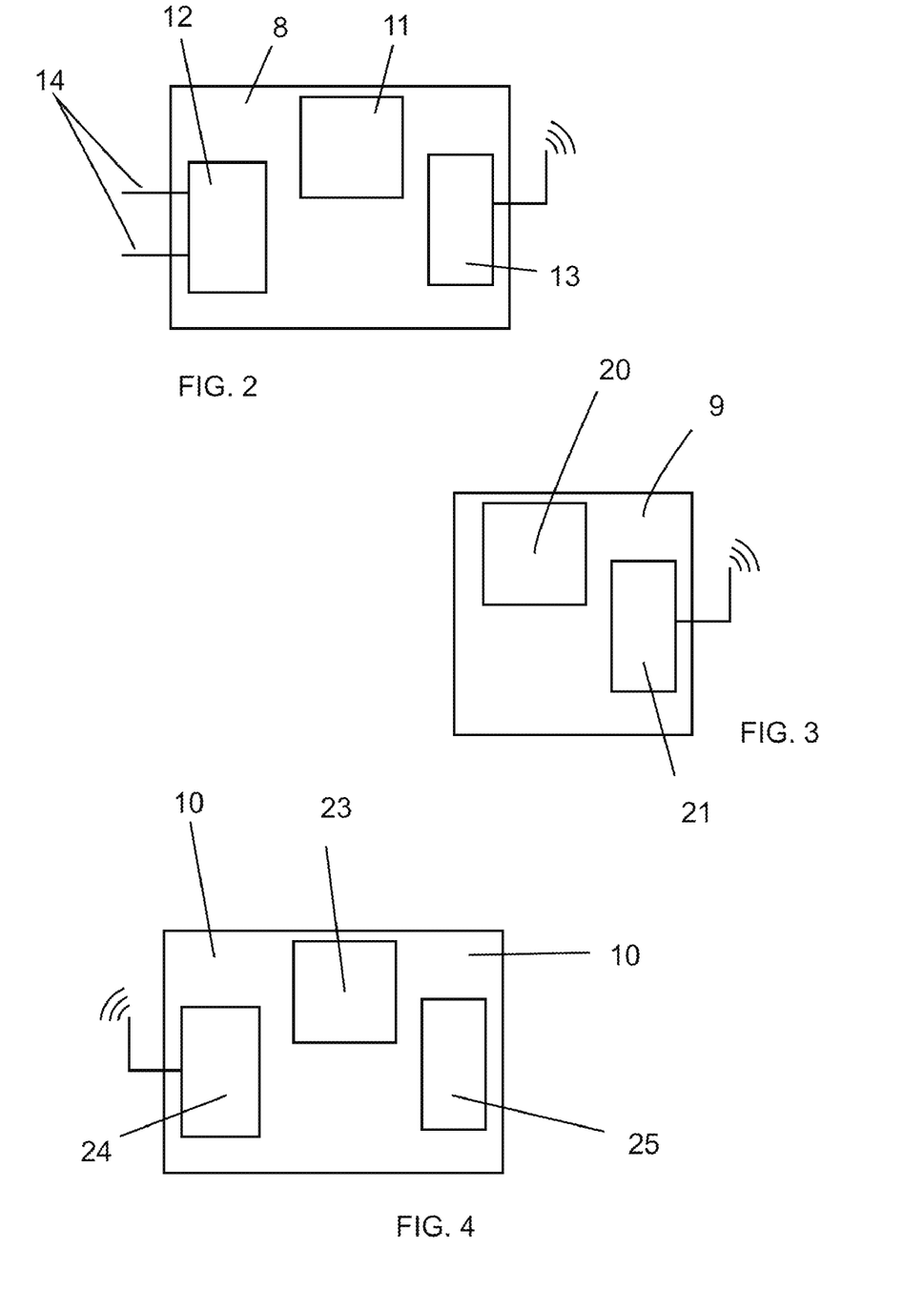
FIG. 2 is the inner scheme of a terrain interconnection box.
FIG. 3 is the inner scheme of a repeater interconnection box.
FIG. 4 is the inner scheme of a farm interconnection box.

FIG. 2 schematically shows the content of the terrain intercommunication box 8 which includes a processing unit 11, an interface unit 12 with the device 4 for interaction with the cattle, and a wireless network communication unit 13.

The processing unit 11 is, for example, a computer provided with a microprocessor, or a programmable logic controller capable of processing data according to a program. The interface unit 12 includes one or several connections 14, whether wired or wireless, through which the interface unit 12 is connected to the device 4 for interaction with the cattle in order to collect digital or analogic information from said device 4, or to provide the device 4 with instructions to follow.

The example of FIG. 1, where the device 4 for interaction with the cattle comprises a weighing platform 5, a diffuser 7, and a radio frequency identifier 15, the terrain intercommunication box 8 is consequently connected, through the connections 14 of the interface unit 12:
  to the identifier 15 to collect info therefrom so as to identify the animal on the weighing platform;
  to the weighing platform 5 in order to collect the weight information the identified animal generates by positioning itself on the weighing platform 5;
  to the diffuser 7 so as to command it to properly apply ink or administer medicine to the identified animal.

The terrain intercommunication box 8 further includes a wireless network unit 13 (see FIG. 2) capable of working according to a mesh network protocol. The wireless network unit 13 may be, e.g., an IEEE 802.11s standard or IEEE 802.15.4 standard access point. Said mesh network works differently from the usual wireless networks, where each element across the network is connected to only one element thereof. In the mesh network, each element—such as the wireless network unit 13—is a network node and can simultaneously connect to all network nodes within the reach of a radio wave so that data can flow through any pathway between the nodes.

The terrain package 1 also includes all the material required to be mounted on the terrain and to provide a power supply. For example, the terrain package 1 includes a pole 16 on which devices can be mounted in the height and a solar panel 17 that gives autonomy to the terrain package 1 in terms of power supply, which is advantageous when it comes to installing the terrain package 1 in remote sites on the farm.

Besides the terrain package 1, the system includes a propagation package 2 intended to diffuse the mesh network wherever required across the farm. The propagation package 2 includes a repeater intercommunication box 9 and a mounting and power supply material, i.e., a pole 18 and a solar panel, in the present example.

The repeater interconnection box 9 includes (refer to FIG. 3) a processing unit 20 and a wireless network unit 21 which are similar to the wireless network units 13 of the terrain interconnection box 8. The repeater intercommunication box 9 is intended to operate as a mesh network node, via the wireless network unit 21. The repeater intercommunication box 9 works as a relay on the mesh network.

The system also includes (refer to FIG. 1) a farm package 3 intended to be installed at the farm office, where cattle management is centralized. The farm package 3 includes a farm intercommunication box 10 and a computer 22. In the present example, the farm package does not include the material necessary for mounting and to provide the power supply thereto, such as a pole and a solar panel because the farm intercommunication box 10 and the computer 22—if to be installed at the farm office—can be simply installed and connected to the electrical grid. As an alternative, for installation at farm offices where electricity is not delivered—or for any other reason—, the farm package 3 may include material for mounting and to provide power supply thereto just like the terrain package 1 and the propagation package 2, besides any material suitable for protecting the package.

The farm interconnection box 10 includes (refer to FIG. 4) a processing unit, a wireless network unit 24 and an interface unit 25 for connection between the farm interconnection box 10 and the computer 22.

The processing unit 11 of the terrain intercommunication box 8, the processing unit 20 of the repeater transmission box 9, and the processing unit 23 of the farm intercommunication box 10 are build up the usual way, for example, with a motherboard which includes a CPU (processor) cooperating with a RAM (memory).

The interface unit 12 of the terrain intercommunication box 8 and the interface unit 25 of the farm transmission box 10 are usual interfaces for communication between outer agents and a processor, for example serial communication interfaces such as USB or RS232, or usual analogic interfaces.

The wireless network unit 13 of the terrain intercommunication box 8, the wireless network unit 21 of the repeater transmission box 9, and the wireless network unit 24 of the farm intercommunication box 10 are build up with a wireless communication board that can work as a mesh network, for example according to the IEEE 802.11s standard or the IEEE 802.15.4 standard, emitting, for instance, at 2.4 GHz or 900 MHz frequencies. Any other wireless network board can be used besides the ones herein cited, provided that such board can work according to a mesh network protocol.

The computer 22 of the farm package 3—besides being connected to the interface unit 25 of the farm intercommunication box 10 via a USB port, for example—is also connected to an outer network. For example, the computer 22 is connected to the Internet via an Ethernet connection. Said connection enables the computer 22 to be connected to a cloud-based networking 26 which is a group of servers intended for collection, storage and processing of the data provided by the computer 22.

The cattle raising management system also includes a mobility package 27 which contains at least one mobile electronic device such as a laptop 28, a tablet 29, a smartphone 30, or any other mobile terminal. The devices 28, 29, 30 of the mobility package 27 are connected to the cloud-based networking 26, for instance, via wireless mobile phone network, and/or directly to the computer 22 via any wireless connection, e.g., Bluetooth or Wi-fi.

The data pathway in the simplified example of the cattle raising management system of FIG. 1 can be summarized as follows. The data collected by the weight sensors of the weighing platform 15 and by the presence sensors and animal identification sensors of the radio frequency identifier 15 are transmitted to the terrain intercommunication box 8. Said data are transmitted from the terrain intercommunication box 8 to the repeater intercommunication box 9 through the wireless mesh network. The repeater intercommunication box 9 works as a relay, retransmitting said data through the wireless mesh network to the farm intercommunication box 10. From the farm intercommunication box 10, the data are sent to the computer 22 via the interface unit 25. In the computer 22, said data may be optionally processed already. From the computer 26, the data are sent across the network to the cloud-based networking 26 to be processed and stored. The farm manager or anyone responsible for making decisions can interact with or consult, with the aid of the computer 22 or the mobility package 27 devices, said collected and processed data. If the decision maker requests, through the computer 22 or a mobility package 27 device, that an action be performed at the terrain, e.g., application of ink or administration of medicine to an animal, said request is transmitted to the farm intercommunication box 10 which transmits it to the repeater intercommunication box 9, which retransmits it to the terrain intercommunication box 8, and the latter activates the diffuser 7 via the interface unit 14.

Figure 5:
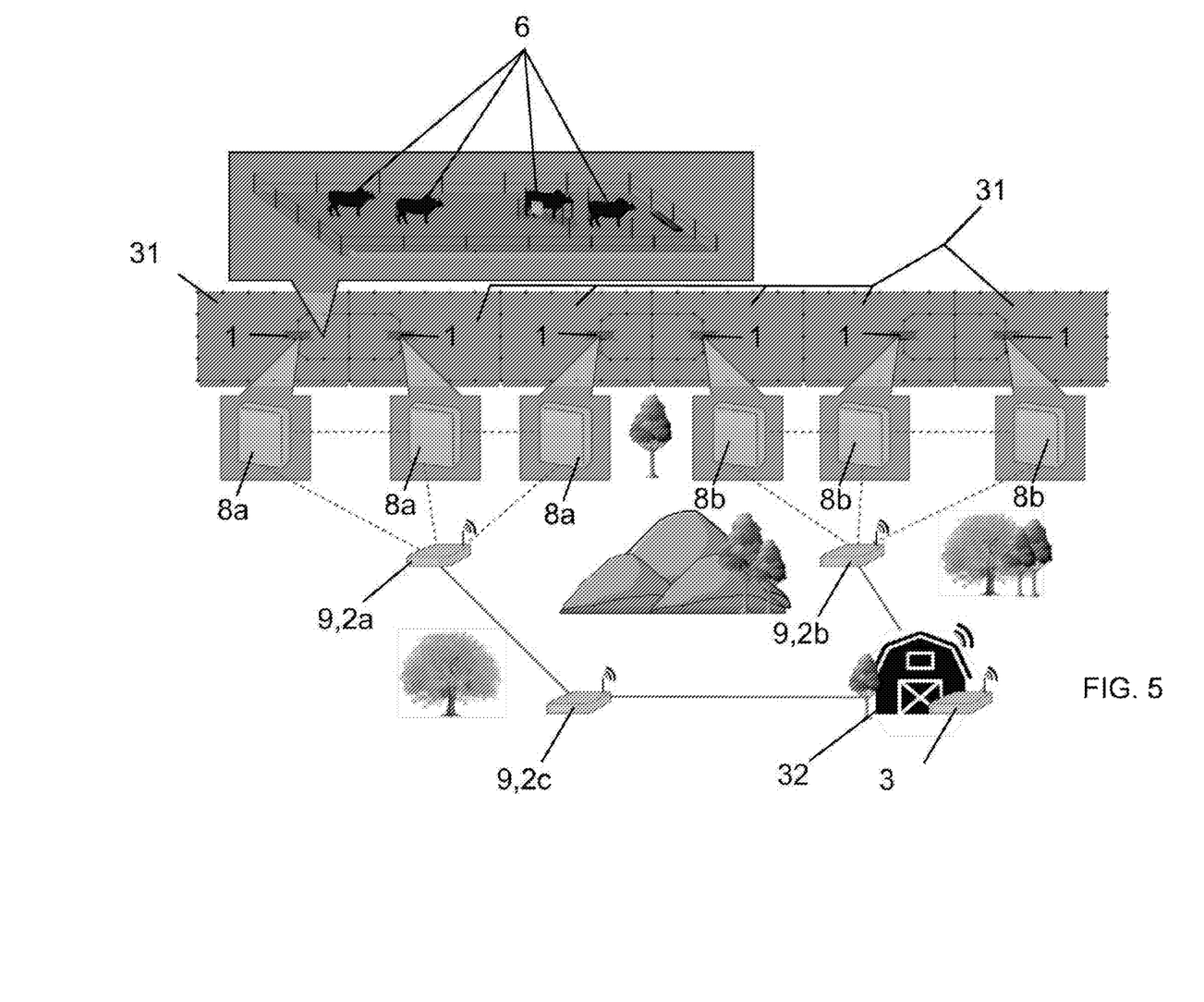
FIG. 5 is an overview of an implementation of the system according to the invention.

FIG. 5 displays the implementation of the cattle raising management system on a farm which, for example, comprises six pastures 31 delimited by fences, for cattle raising. The six pastures 31 are schematically represented side by side, although in fact they are scattered all over the farm.

Each pasture 31 comprises a terrain package 1 discreetly mounted on a place where the animals naturally pass by, like for example on the way to feeders and waterers. The animal may be driven that way by a simple fence-like frame which restricts access to the feeders/waterers in such a way that passing through the device 4 for interaction with the cattle of the terrain package 1 is as natural as it can be (without touching the animal or getting it to walk through said passage, with no need for physical contact).

The terrain intercommunication boxes 8 of the terrain package 1 of each pasture 31 are represented in FIG. 5. Moreover, the cattle raising management system includes, in the example of said figure, three propagation packages 2, each one schematically represented by its repeater intercommunication box 9.

The wireless connections between the terrain intercommunication boxes 8 and the repeater intercommunication boxes 9 are represented by broken lines. It happens that all the terrain intercommunication boxes 8 within the reach of a radio wave from one another are connected to one another. This is what occurs in FIG. 5 with the three terrain intercommunication boxes 8 on the left side of the picture (called "8A"), on one hand, and with the three terrain intercommunication boxes 8 on the right side of the picture (called "8B"), on the other hand. Even if the pastures 31 are scattered all over the farm, the example of FIG. 5 shows the three pastures 31 on the left side of the picture sufficiently close to one another for mesh network connection. The same applies to the three pastures 31 on the right size of the picture. Through the wireless network units 13 of the terrain intercommunication boxes 8, two terrain packages 1 within the reach of a radio wave from one another automatically connect as two nodes of a mesh network.

The three terrain packages 1 on the left side of the picture are also connected through the mesh network to a propagation package 2A which is within their reach. The same applies to the three terrain packages 1 on the right side of the picture, connected to a propagation package 2B.

The propagation packages 2 allow for increased mesh network diffusion reach in such a way that the network reaches other nodes to connect therewith. Thus, in the example of FIG. 5 the mesh network directly reaches the farm package 3, which is inside the farm office 32, from the propagation package 2B. On the left side the mesh network, which is farther away from the farm office 32, needs an extra propagation package 2C to intermediate the network diffusion up to the farm package 3.

Thus, the mesh network comprised of the terrain package 1, the propagation package 2, and farm package 3 adapts to the terrain of the farm, thereby ensuring instruction and data flow.

Figure 6:
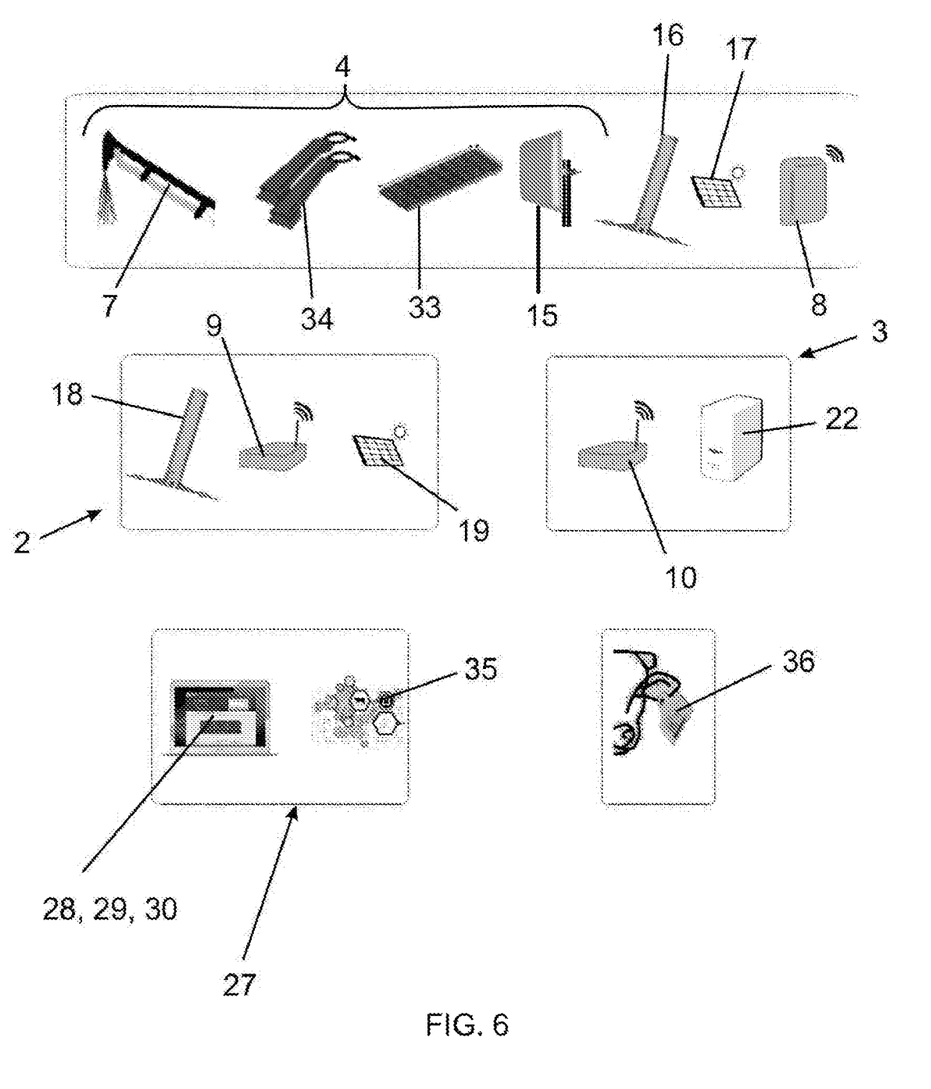
FIG. 6 represents the different packages of the system according to the invention.

FIG. 6 shows an example of the content of the packages 1, 2, 3.

The terrain package 1 includes:
a terrain intercommunication box 8;
one or several devices 4 for interaction with the cattle, e.g., a diffuser 7 (device for operation on the cattle), a scale 5 comprised of a platform 33 and a pair of weighing bars 34, or a radio frequency identifier 15 (device for collecting data on the cattle). Any other device for interaction with the cattle can be part of the terrain package 1.

The terrain package 1 may further include:
mounting material, such as a pole 16;

electrical supply material, such as a solar panel 17.

The propagation package 2 includes a repeater intercommunication box 9 and optionally a mounting and power supply material, such as a pole 18 and a solar panel 19.

The farm package 3 includes a farm intercommunication box 10 and a computer 22.

The cattle raising management system also includes optionally a mobility package 27 that includes one or several mobile devices 28, 29, 30 and one or several software, applications, or algorithms 35 for processing mesh network data and managing them according to an easy-to-use interface the cattle farmer or farm manager can make use of. The software 35 allow for simple and intuitive access, e.g., submission of reports crossing herd indicators, data on the cattle-farming market and the farm's expenses, performance curves for each animal or for a group of animals, provided with graphs of weight gain curve for each animal (based on the weight data history).

The system complementarily includes a radio frequency identification tag for each animal. For example, a unique ear tag 36 for each animal that reacts with the radio frequency identifier 15 in such a way that the latter detects the presence and identifies the animal bearing the ear tag 36.

The cattle management system is a modular system which employs as many packages as needed according to the size and configuration of the farm.

Figure 7:
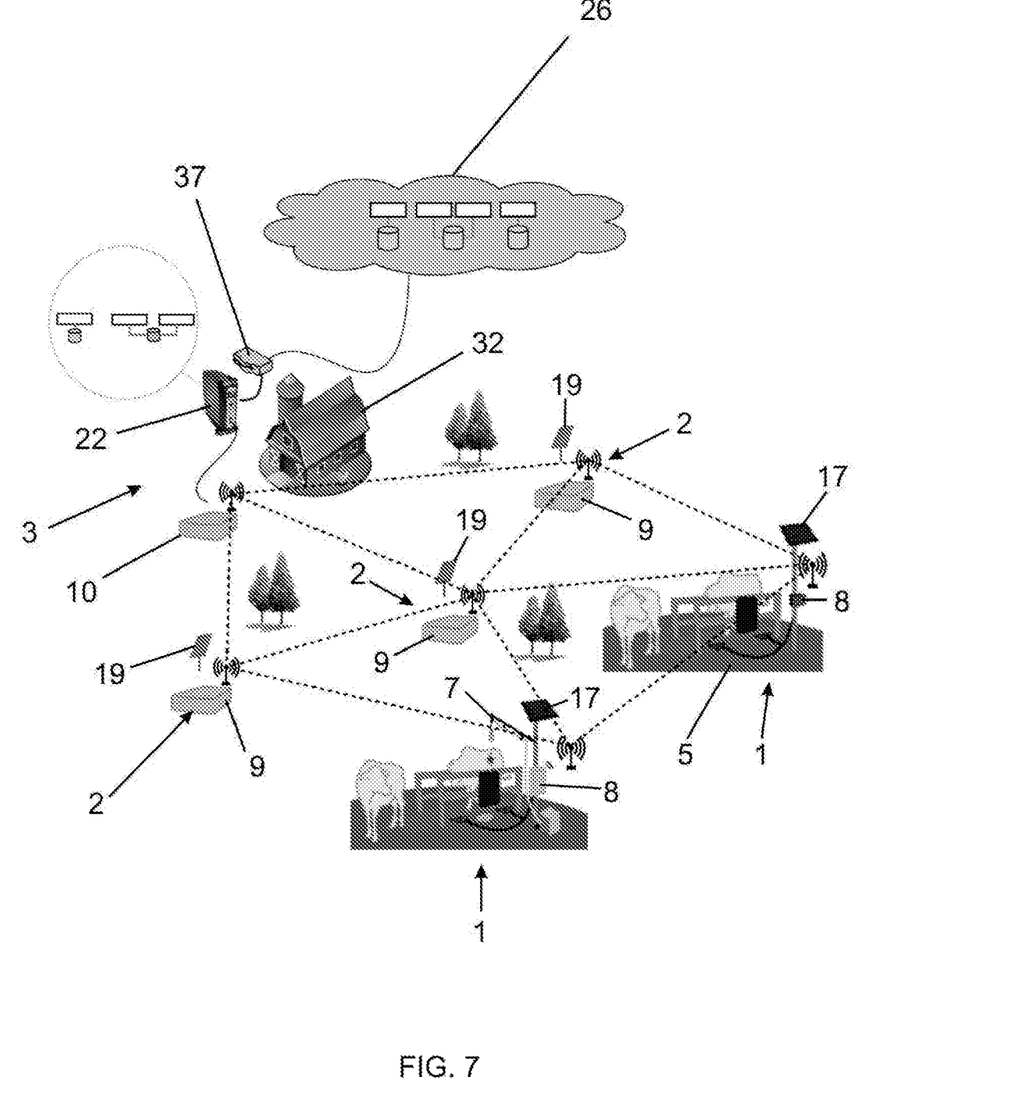
FIG. 7 displays the details of the system according to the invention implemented on a farm.

FIG. 7 shows an example of the implementation of said system on a farm. In said example, the system includes a farm package 3 and two terrain packages 1.

The terrain packages 3 are alike, including a terrain intercommunication box 8, and differ over the device for interaction with the cattle which includes a diffuser 7 in one embodiment, and a weighing platform 5 in the other.

Said system also comprises three propagation packages 2 in order to form the mesh network represented by the broken lines.

It happens that between the farm package 3 and each of the terrain packages 1 data can flow through various pathways, resulting in fault tolerance redundancy. Furthermore, shall any physical changes be made to the farm (addition, removal, relocation of some pastures, or even relocation of the farm office 32), the network will automatically conform to said changes as long as the intercommunication boxes 8, 9, 10 remain within the reach of one another. In the event said changes result in nodes out of the reach from one another in such a way that the mesh network is compromised or cut off, all one has to do is add new propagation packages 2.

Data flowing across the mesh network remain stored, at the farm package 3 level, in the computer 22. The computer 22 is connected to a cloud-based networking 26, in this example via a modem 37, where said data are also stored. Said double storage results in data safety redundancy, in case of computer 22 failure, for example.

Said data can be processed both in the computer 22 and in the cloud-based networking 22 by software, algorithms, databases etc. suitable for the labor tasks on the farm.

The farmer or farm manager can consult said data and the result of the processing directly from the computer 22 or the mobility package 27 described in relation to FIGS. 1 and 6. He can also send action instructions to the terrain packages 1 via said media.

Whereas the preferred example of embodiment was herein described, it must be understood that the scope of the present invention encompasses other possible variations, being limited only by the content of the appended claims, including the possible equivalents.

The invention claimed is:

1. A cattle raising management system comprising:
   at least one terrain package (1) which includes a device (4) for interaction with the cattle, and a terrain intercommunication box (8) connected to the device (4) for interaction with the cattle;
   at least one propagation package (2) which includes a repeater intercommunication box (9); and
   at least one farm package (3) which includes a farm intercommunication box (10) and a computer (22) connected to the farm intercommunication box (10),
   wherein the terrain intercommunication box (8) is configured to
      wirelessly communicate with the repeater intercommunication box (9), and
      wirelessly communicate with the farm intercommunication box (10),
   wherein the repeater intercommunication box (9) is configured to
      wirelessly communicate with the terrain intercommunication box (8), and
      wirelessly communicate with the farm intercommunication box (10),
   wherein the farm intercommunication box (10) is configured to
      wirelessly communicate with the terrain intercommunication box (8), and
      wirelessly communicate with the repeater intercommunication box (9), and
   wherein the terrain intercommunication box (8), the repeater intercommunication box (9), and the farm intercommunication box (10) form a wireless network with each other, and
   wherein said network formed by the terrain intercommunication box (8), the repeater intercommunication box (9) and the farm intercommunication box (10) is a mesh network.

2. The system according to claim 1, wherein said mesh network works according to the IEEE 802.11s standard or IEEE 802.15.4 standard.

3. The system according to claim 1, further comprising a cloud-based networking (26) connected to the computer (22).

4. The system according to claim 3, further comprising at least one mobility package (27) that includes a mobile device connected to the computer (22) or to the cloud-based networking (26).

5. The system according to claim 1, wherein the device (4) for interaction with the cattle of the terrain package (1) includes a radio frequency identifier (15) and wherein the system also includes a radio frequency tag (36) for each animal.

6. The system according to claim 1, wherein the device (4) for interaction with the cattle of the terrain package (1) includes a weighing platform(5).

7. The system according to claim 1, wherein the device (4) for interaction with the cattle of the terrain package (1) includes a diffuser (7) for application of paint or medicine.

8. The system according to claim 1, wherein the terrain package (1) includes a mounting pole (16).

9. The system according to claim 1, wherein the terrain package (1) includes a solar panel (17).

10. The system according to claim 1, wherein the propagation package (2) includes a mounting pole (18).

11. The system according to claim 1, wherein the propagation package (2) includes a solar panel (19).

12. The system according to claim 1, wherein the terrain interconnection box (8), the repeater interconnection box (9) and the farm interconnection box (10) include a processing unit (11, 20, 23) and a wireless network unit (13, 21, 24).

13. The system according to claim 12, wherein the terrain interconnection box (8) and the farm interconnection box (10) include an interface unit (12, 25).

14. A cattle raising management process utilizing a system as defined by claim 1, the process comprising:
storing in the terrain package (1) at least one feature of at least one animal;
transmitting said at least one feature to the farm package (3).

15. The process according to claim 14, wherein the transmission of said at least one feature to the farm package (3) is performed via the propagation package (2).

16. The process according to claim 15, wherein the transmission of said at least one feature to the farm package (3) is performed via any one of the packages (1, 2, 3).

17. A cattle raising management system comprising:
a plurality of terrain packages, each terrain package of the plurality of terrain packages including
a device (4) for interaction with the cattle, and
a terrain intercommunication box (8) connected to the device (4) for interaction with the cattle;
at least one propagation package (2) which includes a repeater intercommunication box (9); and
at least one farm package (3) which includes a farm intercommunication box (10) and a computer (22) connected to the farm intercommunication box (10),
wherein the terrain intercommunication box (8) in the each terrain package of the plurality of terrain packages is configured to
wirelessly communicate with the repeater intercommunication box (9), and
wirelessly communicate with the farm intercommunication box (10),
wherein the repeater intercommunication box (9) is configured to
wirelessly communicate with the terrain intercommunication box (8), and
wirelessly communicate with the farm intercommunication box (10),
wherein the farm intercommunication box (10) is configured to
wirelessly communicate with the terrain intercommunication box (8), and
wirelessly communicate with the repeater intercommunication box (9), and
wherein the terrain intercommunication box (8), the repeater intercommunication box (9), and the farm intercommunication box (10) form a wireless network with each other,
wherein said network formed by the terrain intercommunication box (8), the repeater intercommunication box (9) and the farm intercommunication box (10) is a mesh network.

* * * * *